March 1, 1966
D. H. THORBURN ETAL
MECHANISM FOR INJECTING A CARTRIDGE INTO
A PNEUMATIC CARRIER TUBE
Filed Feb. 20, 1964
3,237,883
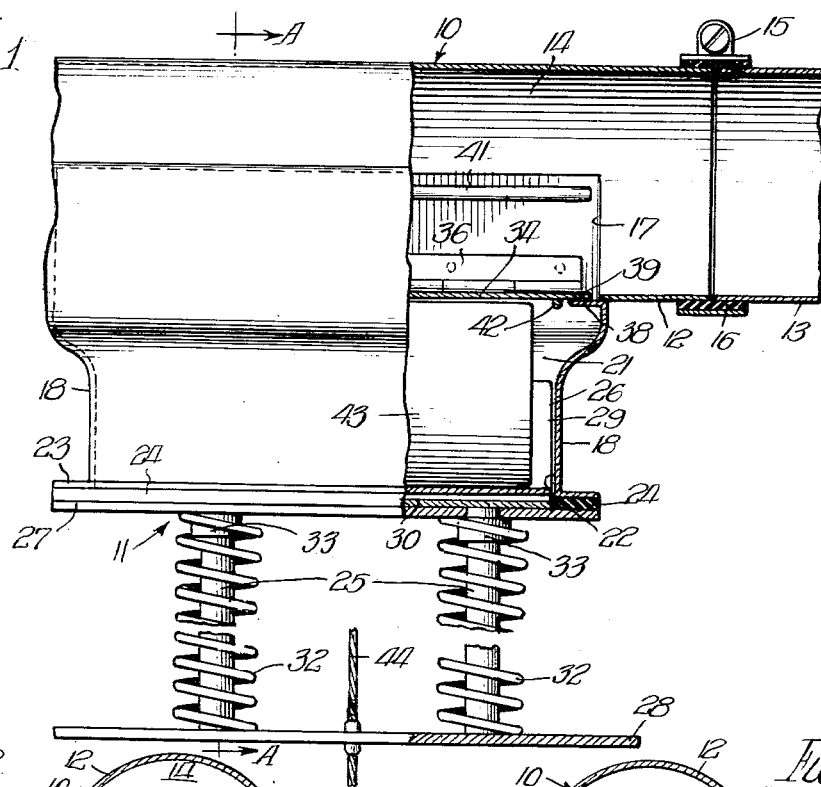
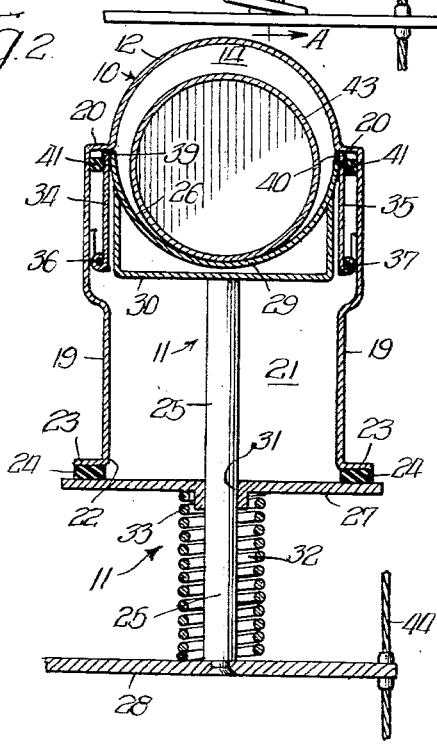
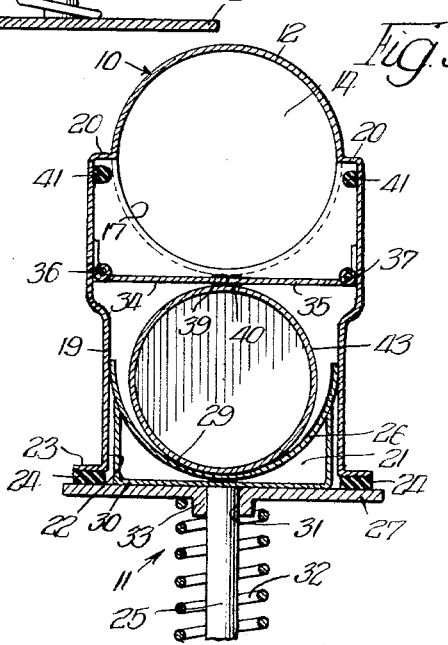
INVENTORS
David H Thorburn,
BY Frederick J. Knight,
Hume, Brown, Clement & Hume
Attys.

United States Patent Office 3,237,883
Patented Mar. 1, 1966

3,237,883
MECHANISM FOR INJECTING A CARTRIDGE INTO A PNEUMATIC CARRIER TUBE
David H. Thorburn, Oak Park, and Frederick J. Knight, Golf, Ill., assignors to The Powers Regulator Company, Skokie, Ill., a corporation of Illinois
Filed Feb. 20, 1964, Ser. No. 346,155
4 Claims. (Cl. 243—25)

This invention relates to pneumatic dispatch systems in which a cartridge is propelled through a pneumatic carrier tube by a circulating medium. More particularly, this invention relates to a mechanism for injecting the cartridge into the pneumatic carrier tube.

It is an object of the present invention to provide a mechanism for injecting a cartridge into a pneumatic carrier tube without exposing the pressure conditions in the pneumatic carrier tube to the ambient atmosphere.

It is a further object of the present invention to provide, in a pneumatic dispatch system, a cartridge insert mechanism in which a spring-biased exterior closure member is adapted to seal off the pneumatic carrier tube from the ambient atmosphere during injection of the cartridge.

It is an additional object of the present invention to provide a cartridge insert mechanism for pneumatic dispatch systems which is self-sealing during injection of the cartridge and which is capable of performing with relative precision, although utilizing a minimum number of parts in order to reduce the expense of manufacture, assembly and repair.

In accordance with the present invention, there is provided a cartridge insert apparatus for pneumatic dispatch systems generally comprising a housing provided with an injection chamber and a loading chamber having a loading aperture, biased interior closure means normally sealing off said injection chamber from said loading chamber, means for receiving and advancing a cartridge through the loading aperture and loading chamber and into the injection chamber, and exterior closure means effective upon advancement of a cartridge into the housing to close the loading aperture prior to the opening of the interior closure means. The loading aperture remains sealed by the exterior closure members until after the interior closure members again seal off the injection chamber from the loading chamber. In this manner, injection of the cartridge is accomplished without exposing the pressure conditions within the pneumatic carrier tube to the ambient atmosphere.

Further objects and advantages of the instant invention will become evident from the more particular description and from the drawings in which:

FIGURE 1 is a partially-sectioned view in elevation of a preferred embodiment of the invention showing the mechanism in loaded position;

FIGURE 2 is a cross-sectional view taken at A—A, FIGURE 1, showing the mechanism in injection position; and FIGURE 3 is a cross-sectional view taken at A—A, FIGURE 1, also showing the mechanism in loaded position.

Referring now to the drawings in which like reference numerals designate like parts, there is shown a preferred form of the cartridge insert mechanism comprising generally a housing 10 and cartridge receiving and advancing means 11.

The housing 10 has a cylindrical casing 12 which is adapted to be aligned with and connected to a cylindrical pneumatic carrier tube 13, as shown in FIGURE 1. The casing 12 thus forms a chamber 14 for cartridge injection. The connections to the pneumatic carrier tube 13 are sealed by means of hose clamps 15 and strip gaskets 16 fabricated of rubber or other suitable material. Intermediate its ends, the cylindrical casing 12 is provided with a longitudinal opening 17 such as would be formed by the removal of a longitudinal casing segment of semi-circular cross-section. Transverse panels 17 are affixed to the casing 12, as by welding. The casing 12 is joined to the longitudinal side panels 18 by flanges 19. The transverse panels 17 and the longitudinal panels 18 are, in turn, joined to define a loading chamber 20 communicating with the longitudinal opening 17 in the casing 12. At its outer end, the loading chamber 21 is open to form a loading aperture 22 and is provided with an outwardly extending flange 23 disposed about the perimeter of the loading aperture 22. Affixed to the flange 23 is a strip gasket 24 fabricated of rubber or other suitable material.

The cartridge receiving and advancing means 11 comprise generally a pair of pedestals 25, a cartridge cradle 26, a spring-biased exterior closure member 27, and lift member 28. The pedestals 25 are elongated, preferably cylindrical, members which, at their ends opposite the cartridge cradle 26, are affixed to the lift member 28. As shown more clearly in FIGURES 2 and 3, the cartridge cradle 26 includes a semi-cylindrical member 29 which is affixed to a supporting member 30. The supporting member 30, in turn, is rigidly affixed to the pedestals 25, as by welding. The axes of the pedestals 25 are preferably normal to and mutually co-planar with the axis of the semi-cylindrical member 29. The diameter of the semi-cylindrical member 29 is preferably equal to the diameter of the cylindrical casing 12 so that, when the cradle 26 is inserted into the housing 10, the edges of the member 29 abut against the edges of the cylindrical casing 12 adjacent the flanges 20. The member 29 is thereby caused to conform to the cylindrical configuration of the casing 12 to define an unobstructed cylindrical passageway.

The exterior closure member 27 is slidably disposed on the pedestals 25 by means of apertures 31. The exterior closure member 27 is complementary with and adapted to effectively seal the loading aperture 22 when urged against the gasket 24.

Referring again to FIGURE 1, disposed between the closure member 27 and the lift member 28 are two coil springs 32 situated about the respective pedestals 25 and biasing the closure member 27 away from the lift member 28. The respective coil springs 32 are positioned generally coaxial with their associated pedestals 25 by means of the annular flanges 33.

Mounted in the interior of the housing 10 are two juxtaposed closure members or doors 34 and 35 which are adapted to meet to seal off the injection chamber 14 and the pneumatic passageway from the ambient atmosphere when a cartridge is not being inserted, as best shown in FIGURES 2 and 3. To effectuate this sealing function, the interior closure members 34 and 35 are respectively mounted on opposing longitudinal side panels 19 by spring-loaded hinges 36 and 37, respectively. The transverse panels 18 are each provided with a protruding stop flange 38, FIGURE 1, which extends transversely from one longitudinal side panel 19 to the other. The interior closure members 34 and 35 are continuously urged by spring-loaded hinges 36 and 37 into a closed position abutting against stop flanges 38. In this position, the interior closure members 34 and 35 meet to seal off the injection chamber 14 from the loading chamber 21. To insure a tight seal, gasket strips 39 and 40 are affixed on the edges of the doors 34 and 35, respectively. It will be noted that the mounting of the hinges 36 and 37 is such that, when the closure members 34 and 35 are in the normally closed position, they form a floor which is contiguous to, and substantially tangent with, the cylindrical ends of the casing 12 in order to avoid introducing an obstructing step into the pneumatic passageway. In their open position, the closure members 34 and 35 abut against stops 41 whereby the interior closure members 34 and 35 are positioned to guide the cradle 26 into lateral alignment with the cylindrical casing 12. As shown in FIGURE 1, the interior closure members 34 and 35 are provided with ribs 42 which longitudinally align the cradle 26 in the cylindrical casing 12.

In operation, a cartridge 43 is placed in the cradle and the lift member 28 is raised manually or by mechanical means such as a hoisting cable 44 or the like, advancing the cartridge 43 through the loading aperture 22 and into the loading chamber 21. If desired, the lift member 28 may be adapted to engage and be advanced along a track (not shown) in order to further insure proper alignment of the cartridge receiving and advancing means 11 with the loading aperture 22, the loading chamber 21, and the injection chamber 14. The length of the bias springs 32 are such that, before the cartridge 43 abuts against the interior closure members 34 and 35, the exterior closure member 27 contacts the gasket 25 to seal off the loading aperture 22, and the interior of the housing 10 generally from the ambient atmosphere, as shown in FIGURES 1 and 3. The lower portions of the panels 18 and 19 are appropriately stepped inward in order to guide the advancement of the cradle 26. Upon further raising of the lift member 28, the sealing force exerted on the exterior closure member 27 and the gasket 24 by the bias springs 32 increases, the cartridge 43 forces open the interior closure members 34 and 35 and enters the injection chamber 14, as depicted in FIGURE 2, and the circulating fluid medium picks the cartridge 43 from the cradle 26 and propels it to its destination. It will be noted from FIGURE 2 that, by adapting the cradle 26 to abut against the flanged edges of the cylindrical casing 12, a stopping point is defined which precludes the cartridge 43 being forced against the opposite side of cylindrical casing 12.

Upon completion of the cartridge injection, the exterior closure member 27 remains in sealing engagement with the loading aperture gasket 24 until the cartridge cradle 26 is withdrawn to the point where the interior closure members 34 and 35 again assume their normally-closed sealing position.

It can now be seen that the subject invention fulfills all the features and objects set forth above. While certain specific terminology and constructions have been utilized and disclosed in the specification, it is to be understood that these are merely by way of example, and in no manner to be considered as limitations. It will be apparent that certain modifications may be made within the scope of the claims without departing from the spirit of the invention.

What is claimed is:

1. In a pneumatic dispatch system, a cartridge insert mechanism comprising:
    (a) a housing adapted to be connected to a pneumatic carrier tube and provided with an injection chamber and a loading chamber having a loading aperture;
    (b) a pair of hinged interior closure members juxtaposed within said housing, said closure members being biased into a normally closed position sealing off said injection chamber from said loading chamber;
    (c) a movable lift member;
    (d) one or more pedestals mounted on said lift member;
    (e) a cartridge-receiving cradle mounted on said pedestals;
    (f) an exterior closure member complementary with said loading aperture and slidably disposed on said pedestals;
    (g) bias means disposed between said lift member and said closure member such that, upon advancement of a cartridge into said housing, said exterior closure member is urged into a position closing said loading aperture prior to the opening of said interior closure members.

2. In a pneumatic dispatch system, a cartridge insert mechanism comprising:
    (a) a housing provided with a loading chamber having a loading aperture and with a cylindrical injection chamber adapted to be connected to a cylindrical pneumatic carrier tube;
    (b) a pair of interior closure members juxtaposed within said housing;
    (c) spring-loaded hinge means biasing said interior closure members into a normally closed position sealing off said injection chamber from said loading chamber;
    (d) a movable lift member;
    (e) one or more pedestals mounted on said lift member;
    (f) a cylindrical, cartridge-receiving cradle mounted on said pedestals;
    (g) an exterior closure member complementary with said loading aperture and slidably disposed on said pedestals;
    (h) spring means disposed between said lift member and said closure member, said spring means biasing said closure member such that, upon advancement of a cartridge into said housing, said exterior closure member is urged into a position closing said loading aperture prior to the opening of said interior closure members.

3. In a pneumatic dispatch system, a cartridge insert mechanism comprising:
    (a) a housing provided with a loading chamber having a loading aperture and a partially-cylindrical injection chamber aligned with and adapted to be connected to a cylindrical pneumatic tube;
    (b) a pair of interior closure members juxtaposed within said housing;
    (c) spring-loaded hinging means biasing said interior closure members;
    (d) means adapted to stop rotation of said interior closure members about said spring-loaded hinge means such that, said interior closure members assume a mutually planar position substantially tangential to a radius of said cylindrical portion of said injection chamber and sealing off said injection chamber from said loading chamber;
    (e) one or more pedestals mounted on said lift member;
    (f) a cylindrical, cartridge-receiving cradle mounted on said pedestals, said cradle being adapted to abut against the cylindrical portion of said injection chamber so as to define, with said cylindrical portion of said injection chamber, a cylindrical configuration substantially the same as and in alignment with said cylindrical pneumatic carrier tube;
    (g) a gasket mounted on the exterior of said housing adjacent to the edges of said loading aperture;
    (h) an exterior closure member complementary with said loading aperture and slidably disposed on said pedestals;
    (i) spring means disposed between said lift member and said exterior closure member, said spring means biasing said exterior closure member such that, upon advancement of a cartridge into said housing, said exterior closure member is urged into engagement with said gasket, whereby said loading aperture is closed prior to the opening of said interior closure, said exterior closure member being maintained in sealing engagement with said gasket until after said interior closure is enabled by withdrawal of said cartridge-receiving cradle to again assume a position sealing off said injection chamber from said loading chamber.

4. In a pneumatic dispatch system, a cartridge insert mechanism comprising:
    (a) a housing having a loading chamber with a loading aperture and having a tubular injection chamber adapted to be connected to a pneumatic carrier tube in compatible, path-defining relationship therewith;

(b) first closure means normally sealing said injection chamber off from said loading chamber;

(c) an operating member movable with respect to said housing;

(d) means for receiving and carrying a cartridge;

(e) means mounting said receiving and carrying means to said operating member in spaced relation therewith;

(f) second closure means complementary with said loading aperture and disposed for movement between said receiving and carrying means and said operating member; and (g) means for biasing said second closure means toward said receiving and carrying means such that, upon advancement of a cartridge into said housing, said second closure means is urged into a position closing said loading aperture prior to the opening of said first closure means.

References Cited by the Examiner

UNITED STATES PATENTS

| 682,985 | 9/1901 | Gray | 243—28 |
|---|---|---|---|
| 1,052,554 | 2/1913 | Ames | 243—25 |

FOREIGN PATENTS

| 477,220 | 1/1953 | Italy. |
|---|---|---|

SAMUEL F. COLEMAN, *Primary Examiner.*

ANDRES H. NIELSEN, *Examiner.*